Dec. 11, 1928.                                                                1,694,401
B. A. SLOCUM
PHOTOGRAPHIC FILM PACKAGE
Filed April 8, 1927

INVENTOR
BENJAMIN A. SLOCUM.
BY
Philip S. Hopkins
ATTORNEY

Patented Dec. 11, 1928.

1,694,401

UNITED STATES PATENT OFFICE.

BENJAMIN A. SLOCUM, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK.

PHOTOGRAPHIC-FILM PACKAGE.

Application filed April 8, 1927. Serial No. 182,100.

My invention relates to film packages and has for its primary object the provision of means for facilitating the coiling of a strip of film within a box or casing.

More specifically, it is an object of this invention to provide within the film box a spring guide for a strip of film, which guide is provided with a coating which substantially reduces the friction of the film against the guide during the coiling operation.

Other objects and advantages in details of construction and operation will be apparent as the description proceeds, reference being had to the figures of the accompanying drawing wherein like reference numerals indicate like parts.

Figure 1:
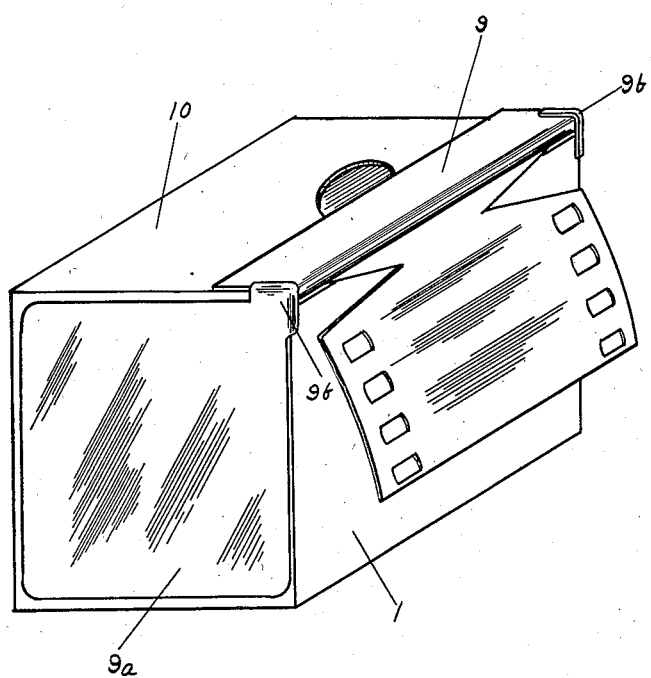
Figure 1 is a perspective view of my film package utilizing my invention.
Figure 3:
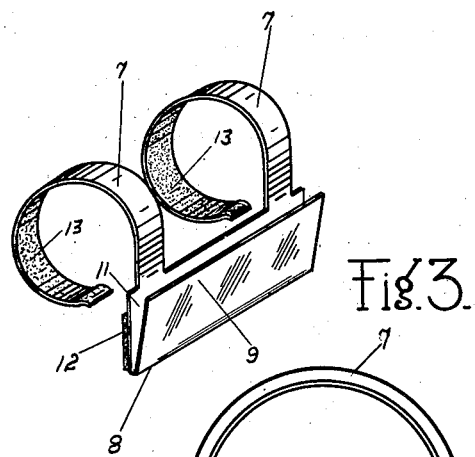
Figure 3 is a detail perspective view of my improved film guide.
Figure 2:
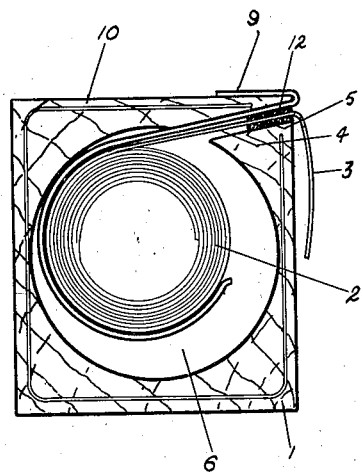
Figure 2 is a detail cross sectional view of such a package.
Figure 4:
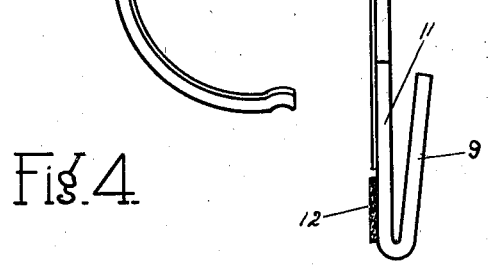
Figure 4 is an enlarged end view thereof.

The reference numeral 1 refers to a hollow box or casing within which is adapted to be coiled a strip of film 2, the free end 3 of which extends through an opening 4 at one corner of the box, said opening being provided on one side as at 5 with a strip of velvet or other suitable material for reducing the likelihood of scratching the film and for preventing the entrance of light through the opening 4 into the box.

The box 1 is hollow as at 6 to provide a chamber for the film 2 and projecting into this hollow chamber 6 is a spring film guide, the inner portion of which comprises the substantially circular spring fingers 7 within which the film 2 coils.

The outer end of the film guide comprises a flat piece of material preferably integral with the fingers 7 bent upon itself as at 8, the upper flange or flap 9 of which extends over the top 10 of the casing adjacent its front edge, and the lower flap or flange 11 lying within the opening 4 and carrying a strip of velvet or other suitable material 12 directly opposite the similar strip 5 on the box itself. It is between these two strips of velvet that the film is withdrawn or inserted with respect to the box.

End pieces 9ª are provided at either end of the box 1 to exclude the light therefrom and these end pieces are provided at one corner with flanged ears 9ᵇ which serve the twofold purpose of preventing light from entering the ends of the opening 4 and of securing the upper flange 9 of the film guide to the box.

The spring finger guides 7 are provided on their inner surface with a coating 13 of wax or other suitable material which is not detrimental to the sensitive film, for the purpose of reducing the friction of the film against such guides as the film is coiled up therein. By thus reducing the friction between the film and the spring fingers 7, with this wax coating, I not only greatly facilitate the coiling of the film within the box but lessen to a marked degree the likelihood of scratching the film through contact with the metal guides 7.

I do not limit myself to the use of wax as a coating as obviously any substance which will accomplish the above described purpose without injury to the film, will suffice. I do not limit myself, therefore, to the exact form herein shown and described other than by the appended claim.

I claim:—

A film package comprising a receptacle adapted to receive a coil of film, a film guide therein, and a wax coating on said guide whereby to reduce the friction on said film.

BENJAMIN A. SLOCUM.